Dec. 20, 1960   R. T. WISE   2,965,499
PACKAGED EDIBLE ARTICLE
Filed Feb. 13, 1959   2 Sheets-Sheet 1

INVENTOR.
ROBERT T. WISE
BY CORBETT, MAHONEY, MILLER
& RAMBO, ATTY'S.

Dec. 20, 1960  R. T. WISE  2,965,499
PACKAGED EDIBLE ARTICLE
Filed Feb. 13, 1959  2 Sheets-Sheet 2

INVENTOR.
ROBERT T. WISE
BY CORBETT, MAHONEY, MILLER
& RAMBO, ATTY'S.

2,965,499
PACKAGED EDIBLE ARTICLE

Robert T. Wise, Columbus, Ohio, assignor, by mesne assignments, to Drumstick, Inc., Columbus, Ohio, a corporation of Texas Filed Feb. 13, 1959, Ser. No. 793,144

1 Claim. (Cl. 99—180)

My invention relates to a packaged edible article. It has to do, more particularly, with a sealed package containing a frozen confection.

This application is a continuation-in-part of my copending application Serial No. 681,538, filed September 3, 1957, now Patent No. 2,934,872. In said copending application, I disclose a process and machine for producing a frozen edible cone article which consists of a sugar-rolled cone filled with ice cream and topped with chocolate and nuts, the article being packaged in a sanitary sealed package. The present application is directed to a packaged article of the type disclosed in said copending application.

According to this invention, I provide a frozen edible cone-shaped article which is packaged in a sealed protective cone-shaped package formed of paper, cellophane, Pliofilm or foil. The upper end of the protective cone of the package is sealed by means of a lid or cap inserted within the upper end of the cone and having an upstanding flange or lip which is seat-sealed to the adjacent inner surface of the material of the protective cone at the outer end of the cone. The upstanding flange or lid preferably projects beyond the upper edge of the wall of the protective cone at angularly spaced intervals therearound to facilitate withdrawal of the lid.

In the accompanying drawings, I have illustrated the preferred embodiment of my invention and in these drawings.

Figure 4:
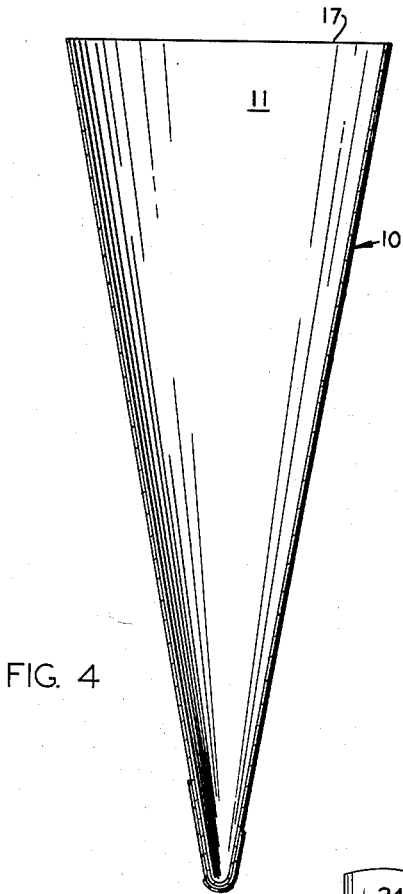
Figure 4 is a side elevational view of the unfilled protective cone of the package.
Figure 5:
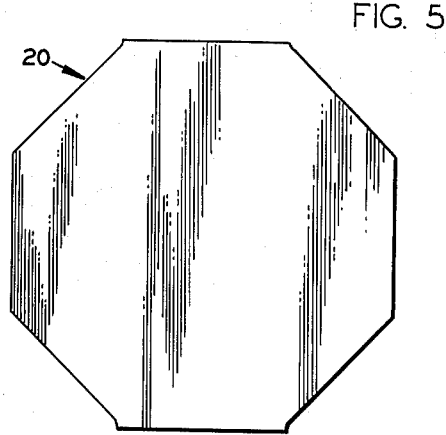
Figure 5 is a plan view of the lid-forming blank of material before insertion into the protective cone of Figure 4.

The protective package for the edible article comprises a hollow cone-shaped body 10 which has an upper open end or mouth 11 of annular cross-section, as shown in Figure 4. This body 10 is preferably formed of paper but may be formed from other flexible material such as cellophane, Pliofilm, foil, etc. It may be formed in various ways but is preferably formed of a strip of the material which is spirally wrapped on a suitable form.

The edible article in the body or protective cone 10 is shown as comprising an edible cone 12 which is inserted into the cone 10 through the open mouth 11. The cone body 10 is of such a size and shape that it is complemental to the cone 12 and when the edible cone 12 is dropped therein, it will bear against the inner surface of the protective cone body throughout the full height of the edible cone 12. With the edible cone 12 supported within the protective cone 10 in this manner, the point 13 at the lower end of the cone 12 will be positioned slightly above the point 14 of the cone 10. At this time also, the upper edge 15 of the cone 12 will be spaced substantially below the upper edge of the protective cone 10.

Figure 1:
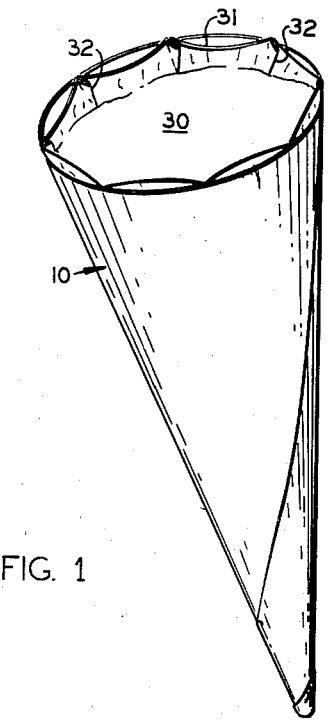
Figure 1 is a perspective view of a packaged frozen confection according to my invention.
Figure 2:
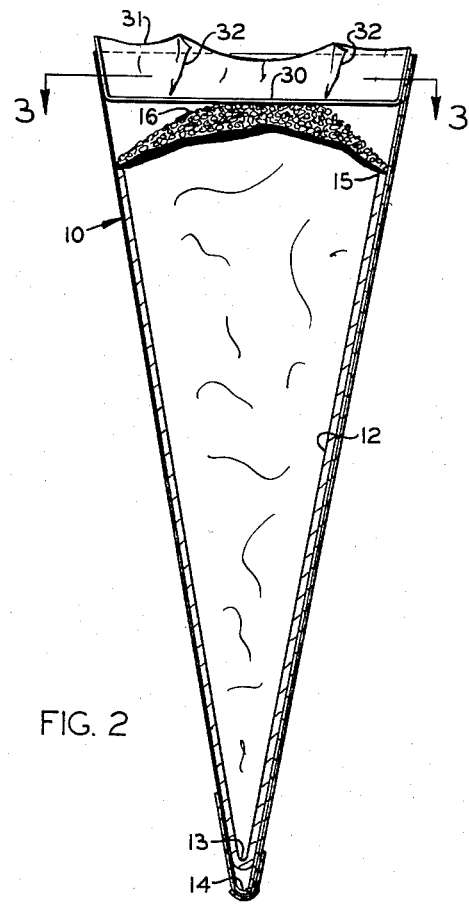
Figure 2 is a vertical or axial sectional view taken through the packaged article.
Figure 3:
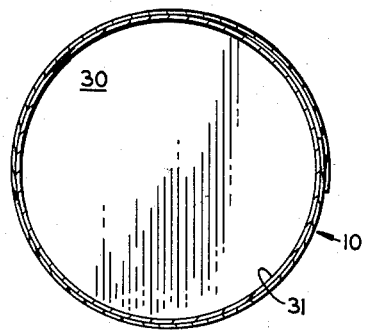
Figure 3 is a transverse or horizontal sectional view taken along line 3—3 of Figure 2.

As disclosed in my said copending application, after the edible cone 12 is positioned within the protective cone 10, the edible cone is filled with ice cream and is topped with chocolate syrup and nuts. It will be filled to its upper edge 15 with a dome-shaped or convex surface extending thereabove, as indicated at 16 in Figures 2 and 6.

To seal the open mouth 11 of the protective cone 10 after it is filled as indicated, a lid blank or membrane 20 of octagonal outline is used. This blank is also preferably formed of paper but may be of other flexible material such as cellophane, Pliofilm or foil. This blank is completely coated or treated, at least on its one side, with a heat-sealing substance such as latex, paraffin wax or microcrystalline wax, polyethylene, etc. which will soften at a relatively low temperature. The blank 20 is inserted in the open mouth 11 of the filled cone 10, is formed and is heat-sealed as it is recessed within the upper edge or lip of the cone 10.

Figure 6:
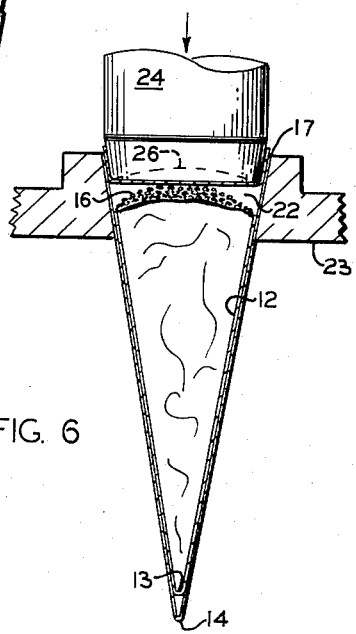
Figure 6 is a vertical sectional view showing the sealed protective cone being sealed by insertion, forming and heat-sealing of the lid-forming blank of Figure 5.

This insertion, forming and sealing of the lid within the upper edge of the cone 10 is accomplished as disclosed in my copending application and as indicated in Figure 6. The filled cone is supported within a conical socket 22, formed within a cup or support 23, with its upper edge 17 substantially flush with the upper extremity of the socket as shown. A heated plunger 24 is provided which has a flared or conical lower end that is complemental to the socket 22 and to the mouth 11 of the protective cone 10. The lower surface of this plunger 24 is preferably concave, as indicated at 26.

The lid blank 20 is centered over the socket 22 and the heated plunger is moved downwardly. As the plunger moves downwardly, the blank 20 is formed to provide a circular flat disk-like body portion 30 with an upstanding irregular flange 31. The disk-like portion 30 is recessed within the upper edge 17 of the cone 10 and is preferably in contact with the dome 16 of the edible contents of the package, being tangentially disposed relative thereto. The irregular upstanding flange 31 will have angularly spaced folds or pleats 33 and projecting tab portions 32, both of which are produced during the insertion and forming of the blank 20. The tab portions 32 may be used in pulling the recessed lid out of the cone 10. The plunger 24 is sufficiently hot and remains in the formed lid and associated mouth of the cone 10 for a sufficient interval to soften the sealing substance on the flange 31 and cause it to adhere to the inner surface of the mouth 11 of the container. It will be apparent that if one side only of the blank 20 is coated with the sealing material, this will be lowermost when the blank is positioned over the mouth of the cone 10 as it is suspended within the socket 22. With the upper edge 17 flush with the top surfaces of the cup 23, there is less danger of the cone sticking in the socket 22 by any of the sealing substance which might flow upwardly from between the flange 31 and the associated mouth 11 of the cone. Also, with the lower end of the plunger 24 concave, there will be less heat transmitted to the dome-shaped upper end 16 of the contents of the cone 10 through the lid body 30 since most of the heat will be concentrated at the flange 31 of the lid.

Thus, the flange 31 will be effectively heat-sealed to the inner surface of the mouth 11 of the cone 10. The disk-like body 30 of the lid will be recessed and will engage the dome 16 of the contents. After hardening of the contents, this will serve to prevent axial movement of the contents outwardly of the protective cone 10 and will serve to aid in preventing damage to the contents. The contents are hardened by placing the filled and sealed package in a hardening room and freezing. Thus, the contents will be completely protected and the lid may be removed easily by grasping any of the tabs 32 of the flange and pulling outwardly to break the heat seal between the flange and the mouth of the cone 10. Although the package is made of inexpensive material, it is sealed in a very effective and sanitary manner. This is accomplished by the heat-sealing operation which is performed by inserting the heated plunger 24 within the mouth of the cone which is supported outwardly by the cup in which it is suspended.

It will be apparent that I provide a packaged edible product comprising a hollow protective cone having a complemental edible cone seated therein with its mouth edge spaced inwardly of the mouth edge of the protective cone to provide an exposed inner annular sealing surface on said protective cone, said edible cone being filled with ice cream which has a convex upper surface, and a protective cap inserted in the end of said protective cone and having an annular outwardly extending flange sealed to said sealing surface and a disk-like body tangential to said convex upper surface of the ice cream, said package being at a sufficiently low temperature to harden the ice cream. Furthermore, the convex or dome-shaped surface of the ice cream may have additional edible material, such as syrup and nuts, applied thereto.

According to the provisions of the patent statutes, the principles of this invention have been explained and have been illustrated and described in what is now considered to represent the best embodiment. However, it is to be understood that, within the scope of the appended claim, the invention may be practiced otherwise than as specifically illustrated and described.

Having thus described my invention, what I claim is:

A packaged edible product comprising a hollow protective cone having a complemental edible cone seated therein with its mouth edge spaced inwardly of the mouth edge of the protective cone to provide an exposed annular sealing surface on said protective cone, said edible cone being substantially filled with edible material, and a protective cap inserted in the mouth of said protective cone, said cap being of flat octagonal form before insertion into the mouth and being positioned therein to provide an outwardly extending annular flange contacting only with and sealed only to said sealing surface of the protective cone and to provide a disc-like body to the periphery of which the flange is attached and extends outwardly therefrom in contact with said sealing surface with a series of tabs extending outwardly beyond the mouth edge of the protective cone at angularly spaced intervals, said disc-like body being positioned in the protective cone outwardly of said edible cone.

References Cited in the file of this patent
UNITED STATES PATENTS

| | | |
|---|---|---|
| 1,436,754 | Chadwick | Nov. 28, 1922 |
| 1,599,267 | Amos | Sept. 7, 1926 |
| 1,714,121 | Barbieri | May 21, 1929 |
| 2,557,602 | Huitt et al. | June 19, 1951 |